J. CALLOW.
APPARATUS FOR MOLDING DOUGH.
APPLICATION FILED JAN. 27, 1909.

917,711.

Patented Apr. 6, 1909.

3 SHEETS—SHEET 1.

Witnesses
Grace P. Brereton
Albert Popkins

Inventor
John Callow
By Sturtevant & Mason
Attys.

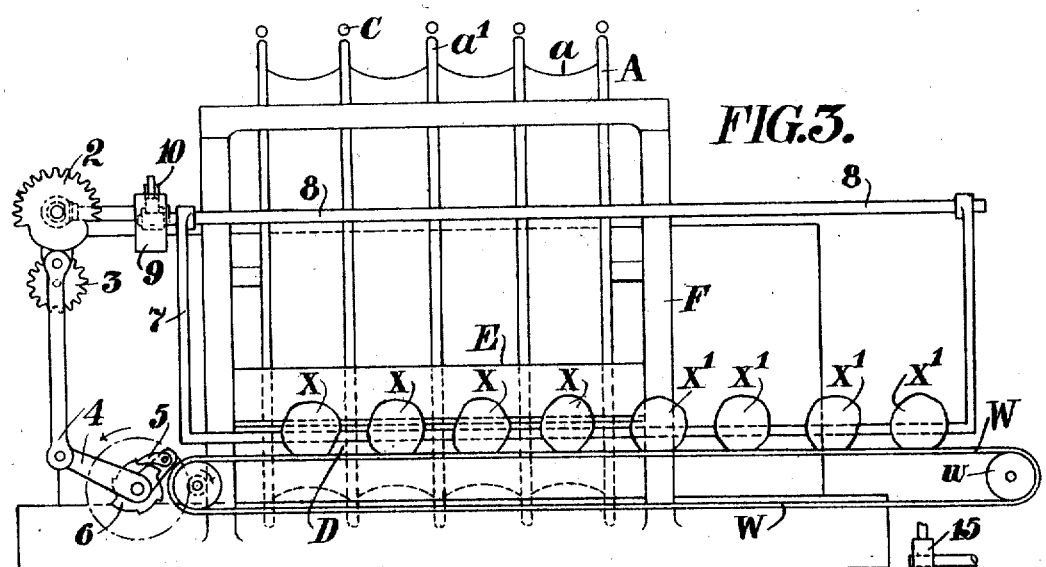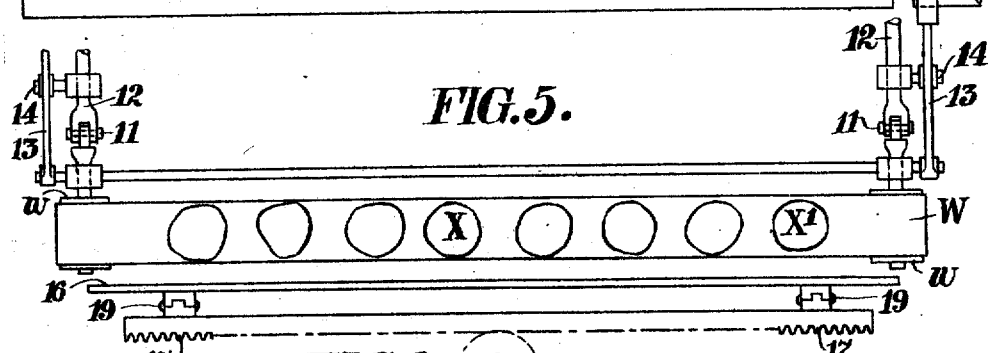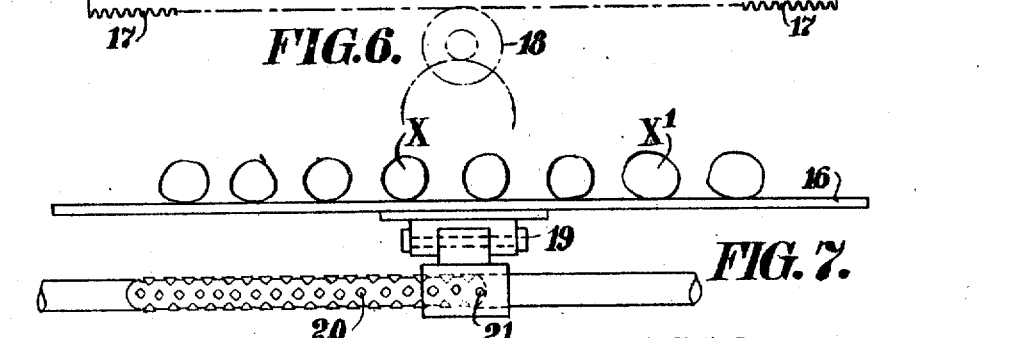

J. CALLOW.
APPARATUS FOR MOLDING DOUGH.
APPLICATION FILED JAN. 27, 1909.
917,711.
Patented Apr. 6, 1909.
3 SHEETS—SHEET 3.
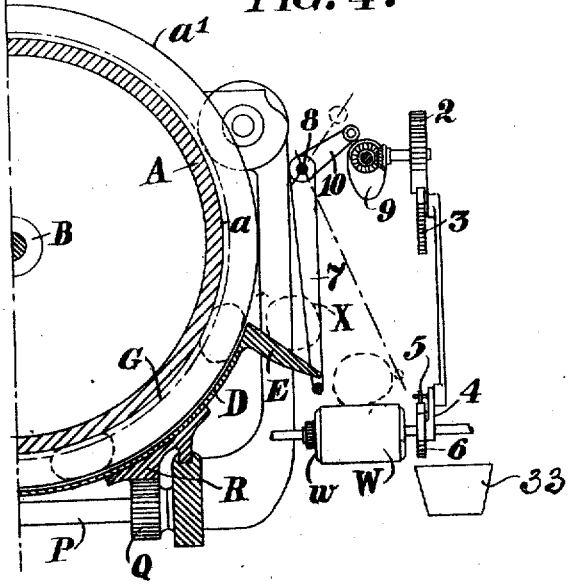
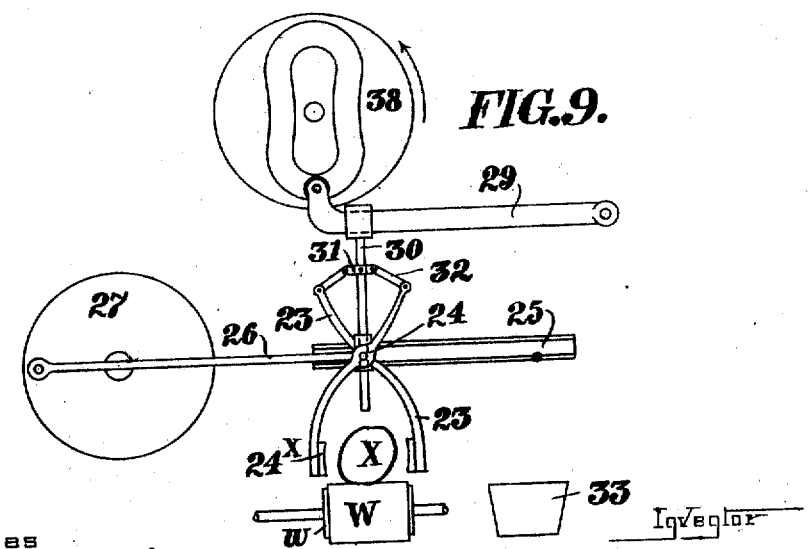

UNITED STATES PATENT OFFICE.

JOHN CALLOW, OF LIVERPOOL, ENGLAND.

APPARATUS FOR MOLDING DOUGH.

No. 917,711.   Specification of Letters Patent.   Patented April 6, 1909.

Application filed January 27, 1909. Serial No. 474,519.

*To all whom it may concern:*

Be it known that I, JOHN CALLOW, a subject of the King of Great Britain, residing at Liverpool, in the county of Lancaster, in the Kingdom of England, have invented certain new and useful Improvements in Apparatus for Molding Dough, of which the following is a specification.

This invention has for its object an apparatus for molding dough, by imparting to the dough pieces a pressure combined with the surface tension after the manner of hand molding.

It also comprises apparatus for automatically delivering the molded pieces to a prover.

Figure 2:
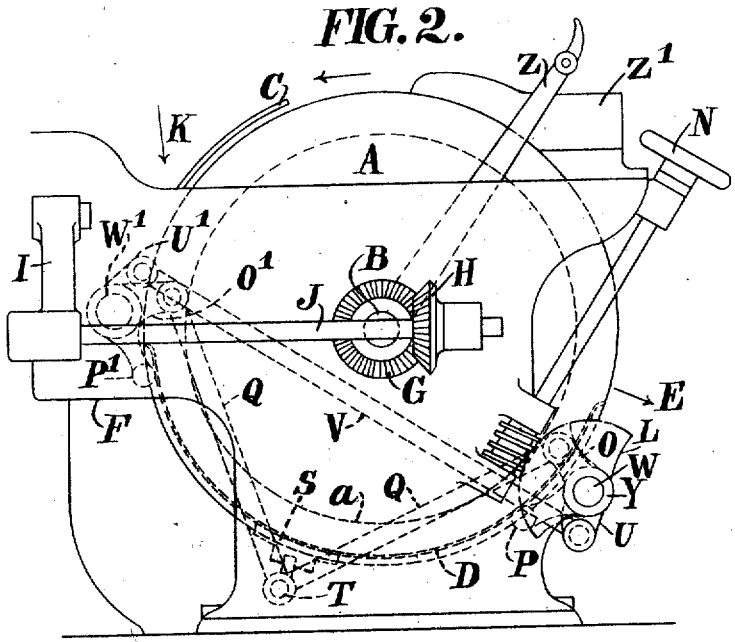
Figure 1:
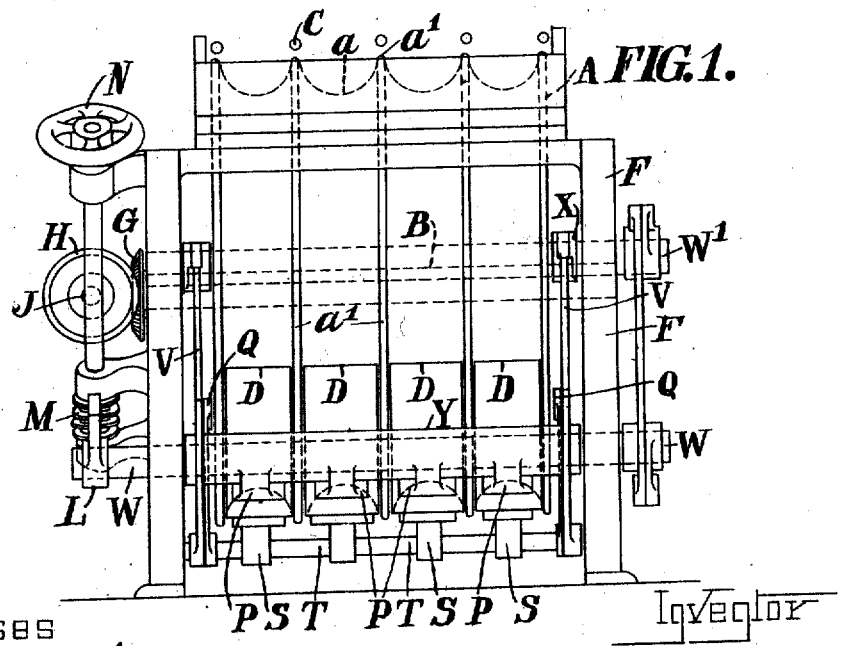

In the accompanying drawings:—Figure 1 is a front elevation; and Fig. 2, a side elevation of a dough molding machine constructed in accordance with my invention; Figs. 3 and 4 are a front elevation and cross section of a portion of the molder, with a device for pushing the dough pieces from the conveyer into the receptacles of the prover; Fig. 5, a plan view, showing the devices for transferring the dough lumps to the receptacles by tilting them off the conveyer; Figs. 6 and 7, a front elevation, showing two arrangements for tilting the dough lumps off the delivery device; Fig. 8, a plan view; and Fig. 9, a front elevation of other devices for transferring the dough lumps to the receptacles of the prover.

A is a drum, which has a series of peripheral grooves $a$ on it, each of which takes a piece of dough and molds it. At the point where the dough is fed into the machine, the flanges $a^1$ between the grooves $a$, are covered or shielded by strips of metal or wood C, which prevent the pieces of dough falling on to the flanges $a^1$, and also lead or direct them into the grooves $a$. Around a portion of the drum in each groove $a$ between the flanges $a^1$ I place a shield D parallel to the axis of the drum A. The drum A revolving and the shields D remaining stationary, the dough pieces are molded into compact lumps or balls between their adjacent surfaces, and a very efficient molding effect is produced. The pieces of dough are fed in through a suitable hopper (not shown) in the direction indicated at K, and are delivered after being molded into compact lumps, from between the drum A and shields D, through a spout at about the point marked E, on to a conveyer band or other suitable delivery device, passing in front of the molder and arranged to deliver the lumps to a prover or elsewhere.

The drawings show a method of turning the drum. In these the drum A is mounted so as to revolve on an axle B which is journaled in the frame F. On this shaft is fixed the bevel wheel G, which is driven by means of the bevel wheel H and driving shaft J, to which shaft the crank I is secured, driven by any suitable mechanism.

In order to regulate the space between the grooves $a$ and the shield D, I provide the following mechanism. W is a shaft and $W^1$ another shaft journaled in bearings in the frame F. On the shaft W is secured a toothed quadrant L. M is a worm journaled in bearings gearing into this quadrant, and N a handle for turning the worm M. This worm imparts motion to the quadrant L, when the handle N is turned. On the shaft W is secured a number of arms P, one for each shield D and bearing against the said shield near one end. These can project from a sleeve Y secured to the shaft W, or be each keyed on the shaft W separately. Secured to the other shaft $W^1$ are similar arms $P^1$ one for each shield D, which bear against the said shields near the other end thereof. S are shoes placed at about mid-length of the shield D and mounted on the shaft T. O is a second arm secured to the shaft W, and $O^1$ a similar arm secured to the shaft $W^1$, these two arms being coupled by the connecting rods Q to the shaft T, which carries the shoes S. U is a third arm keyed on the shaft W, and $U^1$ a similar arm keyed on the shaft $W^1$; V, a connecting rod coupling these two arms together. Consequently by turning the toothed quadrant L by the handle N in one direction, the arms P and $P^1$ and simultaneously the shoes S, press against the shields, and force them toward the bottom of the grooves $a$, while by turning the quadrant in the reverse direction, the shields D expand outward and so increase the space between the shields and the bottom of the grooves.

In order to prevent the dough from sticking in the drum, the drum grooves $a$ are dusted with flour, the device I use being a brush revolving in the arc of a circle, this brush being mounted upon a reciprocating Z to which motion is imparted in any suitable manner. This brush alternately dips into the flour in the trough $Z^1$ and then passes over the drum A as far as the feeding device K.

The mode of action is as follows:—The drum A being driven at a suitable speed, the dough fed in at K, is drawn between the grooves and the shields D. The drum revolving and the shield D remaining stationary, the dough pieces are molded into compact lumps or balls, which are delivered at the point E to conveyer bands by the joint action of the revolving drum A, and the stationary shield D. The grooves in the drum are dusted with flour at each revolution by the device already described. If larger or smaller lumps are required all that is necessary is to turn the handle N one way or the other and the device will produce the exact size of lumps wanted.

In Figs. 3 and 4 a single shield D is provided having a reciprocating motion imparted to it, parallel to the axis of the drum A. The drum A revolving and the shield D reciprocating, the dough pieces are molded into compact lumps or balls, a very efficient molding effect being produced. The pieces of dough are then delivered one or more at a time, from between the drum A and the shield D down the spout E on to the conveyer band W or other suitable delivery device. The drawings show by way of example a method of operating the parts. In these, the drum A is mounted so as to revolve on the axis B see Fig. 4 which is journaled in the frame F. On this shaft B is fixed a spur wheel G indicated in dotted lines in Fig. 4 which is driven by means of any suitable pinion. P is a shaft to which an oscillating motion is imparted in any suitable manner, and on this shaft is fixed the driving pinions Q, gearing the racks R on the shield D, so as to reciprocate the shield as the drum revolves. The dough pieces therefore being fed in between the revolving drum S and the reciprocating shield D, are molded into compact lumps or balls, which are delivered by the lip E on to the conveyer W by the joint action of the shield D and the drum A. The conveyer W delivers the lumps to a prover or elsewhere and at fixed intervals the pieces of dough are pushed or tilted off the conveyer W into the trays of a prover.

In Figs. 3 and 4 the pushing device 7 is hinged at 8 so as to swing thereon, and the dough lumps are pushed from the conveyer W into the trays 33 of the prover. The reciprocation of the pusher is effected by a cam 9 acting on the arm 10 of the pusher 7, the cam being operated by the shaft carrying the mutilated wheel 2. The conveyer can have either a constant or intermittent or reciprocating motion. In Figs. 3 and 4 it has an intermittent movement, this being effected by the mutilated wheels 2 and 3 of known type, which impart an oscillation to the crank arm 4 having a pawl 5 engaging a ratchet wheel 6. This imparts to the conveyer a step by step movement, with an interval of rest, while the dough lumps are being fed from the drum of the molder or other machine to the receptacles of the prover.

When the molder or other apparatus does not deliver the number of pieces of dough required for each row of trays of the prover or other apparatus, then of course some arrangement is needed whereby the molder shall make more than one delivery of dough lumps in order to fill a complete row of receptacles. In the drawings (Figs. 3 and 4) the drum A is shown delivering four dough lumps X on to the conveyer band W. The conveyer W then moves the four dough lumps X forward into the second position $X^1$, and the drum A then delivers four more lumps X on to the conveyer band. The pusher 7 now pushes by its swinging or pushing movement the dough lumps X $X^1$ into the receptacles of the prover.

In Fig. 5 the dough pieces are tilted off the conveyer band W into the trays of the prover. For this purpose the pulleys $w$ around which the conveyer band W passes are fixed on a spindle which is jointed at 11 to the fixed frame 12. 13 is an arm pivoted at 14 and operated by means of a cam 15 or any other suitable device. As the cam 15 rotates it rocks the lever about its pivot 14 and tilts the pulleys $w$, and so allows the dough lumps to slide or drop off the conveyer into the receptacles of the prover. It is obvious that instead of tilting the pulleys the band could be deflected or tilted by plows or forks to cause the lump to fall into the receptacles or band of the prover.

Instead of a conveyer band W any other suitable delivery device in front of the drum A can be used. Thus in Fig. 6, I show a table 16. This table 16 is mounted on a rack 17 to which is imparted a reciprocating movement by the gear wheels 18. The table 16 is hinged to the rack 17 at 19, so that it will tilt thereon, and so discharge the dough lumps into the receptacles of the prover. In place of a rack a right and left handed screw shaft 20 might be used, as shown in Fig. 7, operating a nut 21, to which the table 16 is hinged at 19.

Fig. 8 shows another method of transferring the material to the trays, namely a fixed plow 22 so arranged that as the table 16 traverses, the dough lumps thereon are by means of this plow shoved or pushed off.

In Fig. 9 a grab is shown for catching the dough pieces as they traverse along the conveyer band W. The grab shown in this figure consists of pairs of grab levers or tongs 23 pivoted at 24, with gripping faces $24^\times$ which extend the full length of the rows of dough pieces. The pivot is arranged to have a reciprocating movement in the guide 25, the reciprocation being effected by means of the connecting rod 26 operated by the crank disk 27. 38 is a disk with a cam groove in it, and this groove engages the end of a pivoted lever 29 having a depending spindle 30 to which is fixed the collar 31. To this collar is coupled by links 32 the short arms of the grab levers 23. The crank disk 27 and the cam disk 38 are caused to act in harmony, and as the cam rotates it operates the grab levers 23 so as to grab the dough lumps X in succession, and then by the action of the crank disk 27 transfers the lumps to the receptacles 33 of the prover. It then releases the lumps and the grabs return to their former position.

I declare that what I claim is:—

1. An apparatus for molding dough, including in combination a drum, flanges carried by said drum, said drum having between said flanges a series of peripheral grooves and stationary strips for covering or shielding said flanges for directing the dough pieces into said grooves, and a shield coöperating with said drum.

2. An apparatus for molding dough, including in combination a drum, flanges carried by said drum, said drum having between said flanges a series of peripheral grooves, stationary strips for covering or shielding said flanges for directing the dough pieces into said grooves, a shield coöperating with said drum, a delivering device located at one side of said drum, means for reciprocating said delivering device in a direction substantially parallel with the axis of the drum, means for discharging the pieces of dough on to said delivering device, and means operating to discharge the pieces of dough from said delivering device.

3. An apparatus for molding dough, including in combination a drum, flanges carried by said drum, said drum having between said flanges a series of peripheral grooves, stationary strips for covering or shielding said flanges for directing the dough pieces into said grooves, a shield coöperating with said drum, a delivering device located at one side of said drum, means for discharging the dough pieces from said drum on to said delivering device, means for movng said delivering device, and a swinging pushing device, whereby the dough pieces may be pushed at intervals from the delivering device into the prover.

4. An apparatus for molding dough, including in combination a drum, flanges carried by said drum, said drum having between said flanges a series of peripheral grooves, stationary strips for covering or shielding said flanges for directing the dough pieces into said grooves, a shield coöperating with said drum, a delivering device located at one side of said drum, means for discharging the dough pieces from said drum onto said delivering device, means for moving said delivering device, a swinging pushing device, and means for intermittently moving the same across the delivering device, whereby dough pieces in the delivering device are discharged into the prover.

5. An apparatus for molding dough, including in combination a drum, flanges carried by said drum, said drum having between said flanges a series of peripheral grooves, stationary strips for covering or shielding said flanges for directing the dough pieces into said grooves, a shield coöperating with said drum, a delivering device located underneath said spout, whereby the dough pieces are delivered by said spout onto said delivering device, a rod, means for pivotally supporting said rod, whereby the same swings underneath said spout, and across the upper face of the delivering device, and a cam for intermittently rocking said rod, whereby the dough pieces are discharged from the delivering device into the prover.

In witness whereof, I have hereunto signed my name this 12 day of January 1909, in the presence of two subscribing witnesses.

JOHN CALLOW

Witnesses:
   H. D. JAMESON,
   R. J. WILLIAMS.